Reissued June 29, 1937 Re. 20,430

UNITED STATES PATENT OFFICE 20,430

VINYL ESTER RESINS AND PROCESS OF MAKING THE SAME

George O. Morrison, Shawinigan Falls, Quebec, Canada, Frederick W. Skirrow, Purley, England, and Kenneth G. Blaikie, Shawinigan Falls, Quebec, Canada, assignors to Canadian Electro Products Company, Limited, Montreal, Quebec, Canada No Drawing. Original No. 2,036,092, dated March 31, 1936, Serial No. 349,894, March 25, 1929. Renewed September 24, 1934. Application for reissue April 26, 1937, Serial No. 139,098

42 Claims. (Cl. 260—2)

This invention relates broadly to resinous substances produced from vinyl ester polymers or from the reaction products of vinyl esters and aldehydes and to the process of making the same, and relates more particularly to resinous substances produced from vinyl acetate and aldehydes and to the process of making the same.

The primary object of the invention is to produce resins having properties which render them useful for moulding and other purposes.

Aliphatic vinyl esters may be reacted with saturated aliphatic aldehydes in a wide range of proportions varying from less than one part to more than one hundred parts of aldehyde to one hundred parts of ester, as disclosed in Patent No. 1,725,362, dated August 20, 1929. The products vary from hard, horny consistency to thin, mucilaginous consistency according as the amount of aldehyde is increased.

The vinyl ester polymers and the ester-aldehyde products may be hydrolyzed by heating with mineral acids and water and the hydrolyzed products differ from the unhydrolyzed products in a number of ways and according to the extent of hydrolysis.

According to the present invention, partially or completely hydrolyzed vinyl ester polymers and vinyl ester-aldehyde gums are reacted or condensed, during or subsequently to the hydrolysis reaction, with aldehydes, the reaction depending upon the presence of the active carbonyl group $$>C=O$$

and yield resinous products which are generally much harder and tougher than the gums from which they were formed by reason of the acetal content of the resins, which content may be referred to as polyvinyl acetal.

The ester-aldehyde reaction products made as described in the above identified patent may be regarded for the purposes of this invention as being vinyl ester polymers made in presence of an aldehyde, for the reason that these ester-aldehyde bodies behave in the reactions of this invention in all respects as do vinyl ester polymers of corresponding viscosity made by any other known process. Wherefore, in the following description and in the claims, the terms "vinyl ester polymer" and "polyvinyl ester" are to be understood as including both the vinyl ester-aldehyde products and the vinyl ester polymers made by other processes as aforesaid. The same applies in the case of named ester polymers.

The process and the products are susceptible of variation through a wide range by variation of one or more of the following factors:

(*a*) The viscosity of the vinyl ester polymer.

(*b*) The extent of hydrolysis of the vinyl ester polymer.

(*c*) The amount and character of the aldehyde reacted with the hydrolyzed vinyl ester polymer.

(*d*) The character and amount of acid catalyst used.

The following examples illustrate a few of the many variations of the process but it will be understood that the process is not in any way limited to the materials, proportions, temperatures and times of reaction given as these may be greatly varied.

*Example I*

1000 parts of vinyl acetate-acetaldehyde gum obtained by reacting vinyl acetate containing 2.7% aldehyde is dissolved in 2000 parts ethyl alcohol. To this is added 450 parts of 40% formalin solution and 25 parts concentrated hydrochloric acid, and the whole reacted for fourteen hours at approximately 100° C., in a closed autoclave during which time hydrolysis of the gum and condensation of the hydrolysis product with the aldehyde take place. After recovery of solvent and ethyl acetate formed and removal of acid, the product is dried and is an excellent moulding resin which can be worked on hot rolls, mixed with usual fillers, etc.

The hydrolysis and condensation with aldehyde take place simultaneously and the hydrolysis proceeds about 60% as estimated by the total acid liberated, free and as ethyl acetate. In the early stages of the hydrolysis most of the formaldehyde will combine with ethyl alcohol to form diethyl methylal and water, so that most of the formaldehyde necessary for resin formation comes from reversal of the above reaction. Analysis of the reaction product produced in accordance with the foregoing example shows that substantially 75 to 80% of the hydroxyl groups have been combined with the aldehyde.

*Example II*

The process is conducted as in Example I, except that the parent gum is made by reacting vinyl acetate containing 1.2% of aldehyde. The final product is harder, tougher and stronger than that from Example I. Analysis of the reaction product produced in accordance with Example II shows that substantially 75 to 80% of the hydroxyl groups have been combined with the aldehyde.

It will be noted that in the above examples a solvent for the parent gum was utilized. Ethyl alcohol may be replaced by other solvents but from the standpoint of economy it is preferable to use an alcohol such as ethyl or butyl as by this method the major portion of the acetic acid is recovered as the ester.

The reaction may also be conducted in a two-stage process, the hydrolyzed product being isolated as such and then combined with the desired aldehyde. This is illustrated in Examples III, IV and V following:—

*Example III*

1000 parts of gum as used in Example I is refluxed with several times its weight of water containing 1% to 2% hydrochloric acid until hydrolysis reaches 60%, as determined by the gain in free acid. The resulting hydrolyzed gum is separated from water, dissolved in alcohol, or other suitable solvent, and reacted with 450 parts of 40% formalin solution containing 20 parts concentrated hydrochloric acid (an acetal reaction catalyst) for four hours in a kettle or other suitable reaction vessel fitted with a reflux condenser. After separation of solvent and acid, the product is somewhat harder than that obtained in Example I, due to further hydrolysis during the condensation with formaldehyde. In the hydrolysis stage, a strong mineral acid catalyst is necessary but in the second stage, which is essentially formation of an acetal, any of the well known good acetal reaction catalysts can be used. Analysis of the reaction product produced in accordance with Example III shows that 75 to 80% of the hydroxyl groups have been combined with the aldehyde.

*Example IV*

1000 parts of wet or dry parent gum as in Example I is completely hydrolyzed by refluxing for about ten hours with a large excess of water acidulated with hydrochloric acid, so that the gum is all in solution. About 200 parts of acetaldehyde are added and almost immediate precipitation results. The mixture is refluxed gently for fifteen to twenty minutes and the precipitate is then separated from water and acid as in Example I.

The final resinous product is an extremely fibrous material with high softening point. Analysis of the reaction product produced in accordance with Example IV shows that substantially 65 to 70% of the hydroxyl groups have been combined with the aldehyde.

*Example V*

The process of Example IV is repeated up to and including the condensation with aldehyde and, after precipitation, the refluxing is continued for three to four hours or until the precipitate dissolves. The solution is cooled below the boiling temperature of acetaldehyde and the same amount of acetaldehyde as before added, which causes a second precipitation. The resulting product is a non-fibrous mass of high softening point which can be worked on hot rolls, moulded, etc. Analysis of the reaction product produced in accordance with Example V shows that substantially 80 to 85% of the hydroxyl groups have been combined with the aldehyde.

*Example VI*

The process of Example I is followed, substituting acetaldehyde for formaldehyde in the acetal reaction. The final product is similar to the formaldehyde product except that in general the formaldehyde products are somewhat stronger and tougher. Most of the acetaldehyde is soon changed to paraldehyde and diethyl acetal so that most of the acetaldehyde necessary for resin formation comes from the breakdown of these bodies. Analysis of the reaction product produced in accordance with Example VI shows that substantially 75 to 80% of the hydroxyl groups have been combined with the aldehyde.

*Example VII*

The process of Example IV is followed, substituting formaldehyde for acetaldehyde in the acetal reaction and refluxing the precipitate and water for two to three hours. The product is much more fibrous than that obtained according to Example IV. Analysis of the reaction product produced in accordance with Example VII shows that substantially 75 to 80% of the hydroxyl groups have been combined with the aldehyde.

*Example VIII*

1000 parts of vinyl acetate-acetaldehyde gum obtained by reacting vinyl acetate containing 5% acetaldehyde is dissolved in 2000 parts ethyl alcohol, and treated with 500 parts 40% formalin and 12 parts concentrated hydrochloric acid. The mixture is heated under a reflux condenser for ten hours.

The gum is 50% hydrolyzed and the resin product is hard at 60° C., but can be readily worked on hot rolls. The resin has a lower softening point than one of similar hydrolysis percentage using the parent gum made with less aldehyde, that is, a gum of higher viscosity. Analysis of the reaction product produced in accordance with Example VIII shows that substantially 75 to 80% of the hydroxyl groups have been combined with the aldehyde.

Primary gums made with aliphatic vinyl esters and saturated aliphatic aldehydes other than those of acetic acid, such as vinyl butyrate, vinyl propionate, butyraldehyde and propylaldehyde, etc., may be treated with various aldehydes along the lines indicated in the examples and yield products of various characteristics. It is not necessary that corresponding esters and aldehydes be used in making the primary gums as these may be different; for instance, an acetic ester and a butyric or propionic aldehyde may be reacted and the gum may be treated with still another aldehyde, such as formaldehyde, or with an aldehyde corresponding to either the aldehyde or the ester used in formation of the gum. The aldehyde used in the acetal reaction is not necessarily aliphatic nor necessarily saturated, as good results are obtained using aromatic aldehydes, such as benzaldehyde and furfural, or unsaturated aldehydes such as crotonaldehyde.

The amount of aldehyde used in the acetal reaction may vary within wide limit, but the amount combined seems to vary downwards from a maximum of one molecule of aldehyde to each two hydrolyzed ester groups.

Polymerized vinyl esters may be partially or completely hydrolyzed and the hydrolyzed products reacted with aldehydes along lines similar to those already disclosed, the hydrolysis reaction with dilute mineral acid being slower as these bodies seem to be more difficult to hydrolyze under the above mentioned conditions.

It will be seen from the foregoing disclosure that a great variety of resins may be obtained depending upon the polyvinyl ester used, the extent of the hydrolysis reaction and the nature and amount of the aldehyde combined. The percentage hydrolysis may vary from very little—say 5% or less—up to 100%, depending upon the concentration of the catalyst used and the time of heating.

The properties of the vinyl ester polymers utilized are not such as to lend themselves to a great extent to use in the manufacture of moulding products of all types since they have no great physical strength nor toughness, and in general have too low softening points. Starting with a definite polymer, the properties of the resins vary through a wide range in their physical properties, those of lower hydrolysis being of low softening point and this increasing as the percentage hydrolysis is increased until when the completely hydrolyzed product is combined with aldehydes the product is of very high softening point. Thus, products are obtained which may be adapted for various uses, not only by the use of the pure resins themselves but by the blending of the same. In general, these products are tough and strong.

It may be pointed out that when polymerized vinyl ester is completely hydrolyzed in absence of aldehyde the aforesaid aldehyde reaction undoubtedly takes place with the hydroxyl groups of polyvinyl alcohol, and in the same way when the vinyl ester-aldehyde gum is completely hydrolyzed in absence of aldehyde the reaction probably takes places similarly, but the combination takes place with the hydroxyl groups of a polyvinyl alcohol of lesser molecular weight, this varying with the amount of aldehyde used in making the parent gum—the more aldehyde used the lesser the molecular weight. In the case of partially hydrolyzed polyvinyl esters, it is, of course, understood that the aldehyde reaction takes place with the hydroxyl groups which have been introduced into the chain in place of a part of the acidyl groups.

Materials in which hydroxyl groups are combined with aldehyde, as herein disclosed, have resinous characteristics which distinguish them from condensation products of polyvinyl alcohol and an aldehyde which have large amounts of the hydroxyl groups remaining uncombined.

In the foregoing description and following claims, except where the context requires otherwise, the terms "hydrolyzing", "hydrolyzed" and "hydrolysis product" are to be understood as denoting any degree of hydrolysis up to and including complete hydrolysis, and the expression "reacting with" as applied to the reaction of aldehyde and hydrolyzed vinyl ester polymer, is to be understood as including that reaction both during hydrolysis and after hydrolysis has been first carried to any desired degree.

Having thus described our invention, what we claim is:—

1. A process which comprises reacting together an aldehyde and a partial hydrolysis product of a polyvinyl ester in presence of an acid catalyst in such proportions and at such temperatures and for a time sufficient to produce a resinous material.

2. A process which comprises reacting together an aldehyde and a partial hydrolysis product of a polyvinyl ester in presence of such a catalyst and in such proportions and at such temperatures and for a time sufficient to produce a resinous product.

3. A process which comprises catalytically reacting together an aldehyde and an hydrolysis product of a polyvinyl ester and in such proportions and at such temperatures and for a time sufficient to produce a resinous product in which at least 65% of the hydroxyl groups of the hydrolysis product have combined with the aldehyde.

4. A process which comprises catalytically reacting together an aldehyde and a polyvinyl ester which is at least partially hydrolyzed and in such proportions and at such temperatures and for a time sufficient to produce a resinous product.

5. A process which comprises catalytically reacting together an aldehyde and a polyvinyl ester which has been at least partly hydrolyzed in such proportions and at such temperatures and for a time sufficient to produce a resinous material, said reaction being performed in presence of a solvent.

6. A process which comprises reacting together, in presence of an acid, an aldehyde and a polyvinyl ester which has been at least partly hydrolyzed, in such proportions and at such temperatures and for a time sufficient to produce a resinous material.

7. A process which comprises reacting together in the presence of a catalyst an aldehyde and a polyvinyl ester which has been at least partly hydrolyzed, and in such proportions and at such temperatures and for a time sufficient to produce a resinous material, said reaction being performed in presence of a solvent.

8. A process which comprises catalytically reacting together an aldehyde and a polyvinyl ester which has been at least partly hydrolyzed, and in such proportions and at such temperatures and for such time that the condensation of the aldehyde with the hydrolysis product attains a minimum of approximately 65% of completion and a resinous material is produced, said reaction being performed in presence of a solvent.

9. A process which comprises reacting together an aldehyde and an hydrolysis product of a polyvinyl ester in presence of a liquid monohydric alcohol and in presence of a catalyst and in such proportions and at such temperatures and for a time sufficient to produce a resinous material.

10. A process which comprises reacting together a polyvinyl ester, water and an aldehyde in presence of an acid catalyst, in such proportions and at such temperatures and for a time sufficient to produce a resinous material.

11. A process which comprises reacting together a polyvinyl ester, water and an aldehyde in presence of a catalyst and in such proportions and at such temperatures and for a time sufficient to produce a resinous material.

12. A process which comprises reacting together a polyvinyl ester, water and an aldehyde in presence of an inorganic acid-reacting substance as catalyst, the proportions of the reactants and the duration and temperature of the reaction being such that hydrolysis of the ester and condensation of the hydrolysis product with the aldehyde produces a resinous material, the reaction being carried out in presence of a solvent.

13. A process of making resins which comprises reacting together a polyvinyl ester and an aldehyde in presence of an inorganic acid-reacting substance as catalyst and in presence of a liquid medium comprising a monohydric alcohol and water to initiate hydrolysis of the polyvinyl ester.

14. A process which comprises reacting together a polyvinyl ester, water and an aldehyde in presence of an inorganic acid-reacting substance as catalyst and in such proportions and at such temperatures and for a time sufficient to produce a resinous material, said reaction being carried out in presence of a liquid medium comprising the acid corresponding to the said polyvinyl ester.

15. A process for the production of artificial masses which comprises acting with an aliphatic aldehyde on a polymerized vinyl alcohol in the presence of an inorganic acid-reacting substance.

16. A process for the production of artificial masses which comprises acting with an aliphatic aldehyde on a polymerized vinyl alcohol in the presence of hydrochloric acid.

17. A process which comprises catalytically reacting a hydrolyzed polyvinyl ester with an aldehyde and in such proportions and at such temperatures and for a time sufficient to produce a resinous material, said reaction being carried out in presence of acid liberated by hydrolysis of the polyvinyl ester.

18. A process which comprises catalytically reacting a hydrolyzed polyvinyl ester with an aldehyde in such proportions and at such temperature and for a time sufficient to produce a resinous material, the said reaction being carried out in presence of an acid corresponding to the polyvinyl ester.

19. A process which comprises catalytically reacting an hydrolysis product of polyvinyl acetate with an aldehyde in such proportion and at such temperature and for such time that a resinous material is produced, said reaction taking place in the presence of acetic acid liberated by hydrolysis.

20. The process which comprises hydrolyzing polyvinyl acetate in solution with a mineral acid catalyst and reacting the hydrolysis product with formalin solution and continuing the reaction until the hydrolysis proceeds to sixty per cent and condensation with formaldehyde takes place to produce a resinous material.

21. The process which comprises hydrolyzing polyvinyl acetate in solution with hydrochloric acid and reacting the hydrolysis product with formalin solution and continuing the reaction until the hydrolysis proceeds to sixty per cent and condensation with formaldehyde takes place to produce a resinous material.

22. The process which comprises hydrolyzing polyvinyl acetate in solution in alcohol with an acid catalyst and reacting the hydrolysis product with formalin solution and continuing the reaction until the hydrolysis proceeds to sixty per cent and condensation with formaldehyde takes place to produce a resinous material.

23. The process which comprises hydrolyzing polyvinyl acetate in solution in ethyl alcohol with hydrochloric acid and reacting the hydrolysis product with formalin solution and continuing the reaction until the hydrolysis proceeds to sixty per cent and condensation with formaldehyde takes place to produce a resinous material.

24. The process which comprises reacting polyvinyl acetate with water and a mineral acid until the hydrolysis reaches sixty per cent, then separating the hydrolyzed product from the water, and reacting the same in solution with formalin solution containing a mineral acid catalyst to form a resinous material.

25. The process which comprises hydrolyzing polyvinyl acetate with water and hydrochloric acid until the hydrolysis reaches sixty per cent, then separating the hydrolyzed product from the water, and reacting the same in solution with formalin solution containing a mineral acid catalyst to form a resinous product.

26. A process which comprises completely hydrolyzing a polyvinyl ester with water and a catalyst and thereafter reacting an aldehyde with the said hydrolysis product in presence of a catalyst, the hydrolysis product, aldehyde and catalyst being present in such proportions and the reaction being conducted at such temperatures and for a time sufficient for condensation of the hydrolysis product with the aldehyde to attain at least 65% of completion and a resinous material is produced.

27. A process which comprises reacting together polyvinyl acetate in solution in ethyl alcohol and formalin solution in presence of hydrochloric acid as a catalyst, the proportions of polyvinyl acetate, ethyl alcohol and formalin solution and catalyst and the temperature and duration of the reaction being such that hydrolysis proceeds to about 60% and condensation of the hydrolysis product with the aldehyde attains at least 75% of completion and produces a resinous material.

28. A process which comprises reacting together polyvinyl acetate, water and hydrochloric acid in such proportions and for such time that hydrolysis attains to 60%, separating the hydrolysis product from the water and dissolving the separated product in ethyl alcohol and reacting with formaldehyde solution in presence of hydrochloric acid as catalyst, the proportions of hydrolysis product, alcohol, aldehyde and catalyst and the duration and temperature of the reaction being such that condensation of the hydrolysis product with formaldehyde attains to at least 75% of completion and a resinous material is produced.

29. A process which comprises completely hydrolyzing polyvinyl acetate with water and hydrochloric acid and thereafter reacting the hydrolysis product, in solution, with an aldehyde, the proportions of reactants and the duration and temperature of the reaction being such that condensation of the hydrolysis product with the aldehyde attains at least 65% and a resinous material is produced.

30. A process which comprises reacting together polyvinyl acetate in solution in ethyl alcohol and acetaldehyde in presence of hydrochloric acid as a catalyst, the proportions of polyvinyl acetate, ethyl alcohol and acetaldehyde and catalyst and the temperature and duration of the reaction being such that hydrolysis proceeds to about 60% and condensation of the hydrolysis product with the aldehyde attains at least 75% of completion and produces a resinous material.

31. A process which comprises completely hydrolyzing polyvinyl acetate with water and hydrochloric acid and thereafter reacting the hydrolysis product, in solution, with formaldehyde, the proportions of reactants and the duration and temperature of the reaction being such that condensation of the hydrolysis product with the aldehyde attains at least 75% of completion and a resinous material is produced.

32. A synthetic resin being the product of the process of claim 1 and characterized by the interaction of an aldehyde with an hydrolysis product of a polyvinyl ester.

33. A synthetic resin being the product of the process of claim 4 and characterized by the interaction of an aldehyde with an hydrolysis product of a polyvinyl ester.

34. A synthetic resin being a condensation product of an aldehyde and an hydrolysis product of a polyvinyl ester characterized in that a minimum of approximately 65% of the hydroxyl groups of the hydrolysis product have been reacted with the aldehyde.

35. A synthetic resin being the product of the process of claim 6, and characterized by the interaction of an aldehyde and an hydrolysis product of a polyvinyl ester.

36. A resin being the product of the interaction of an aldehyde with an hydrolysis product of a polyvinyl ester and containing in the molecule organic acid radicals, acetal groups and uncombined hydroxyl groups.

37. A synthetic resin being the product of the process of claim 27 and characterized in that at least 75% of the hydroxyl groups of the hydrolyzed polyvinyl acetate have reacted with the formaldehyde.

38. A synthetic resin being the product of the process of claim 28 and characterized in that at least 75% of the hydroxyl groups of the hydrolyzed polyvinyl acetate have reacted with the formaldehyde.

39. A synthetic resin being the product of the process of claim 29 and characterized in that at least 65% of the hydroxyl groups of the hydrolysis product have reacted with the aldehyde.

40. A synthetic resin being the product of the process of claim 30, and characterized in that at least 75% of the hydroxyl groups of the hydrolyzed polyvinyl acetate have reacted with the acetaldehyde.

41. A synthetic resin being the product of the process of claim 31, and characterized in that at least 75% of the hydroxyl groups of the hydrolysis product have reacted with the formaldehyde.

42. A synthetic resin being a condensation product of an aldehyde of the group consisting of formaldehyde, acetaldehyde, benzaldehyde, propionic aldehyde, butyric aldehyde, furfural and crotonaldehyde with a hydrolysis product of a polyvinyl ester characterized in that a minimum of approximately 65% of the hydroxyl groups of the hydrolysis product have been reacted with the aldehyde.

GEORGE O. MORRISON.
FREDERICK W. SKIRROW.
KENNETH G. BLAIKIE.